United States Patent
Ji et al.

(10) Patent No.: US 10,187,802 B2
(45) Date of Patent: Jan. 22, 2019

(54) ACCESSIBILITY IN DYNAMIC CELLULAR NETWORKS

(71) Applicant: Apple Inc., Cupertino, CA (US)

(72) Inventors: Zhu Ji, Cupertino, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 13/854,810

(22) Filed: Apr. 1, 2013

(65) Prior Publication Data

US 2014/0099941 A1  Apr. 10, 2014

Related U.S. Application Data

(60) Provisional application No. 61/711,524, filed on Oct. 9, 2012.

(51) Int. Cl.
| | |
|---|---|
| H04W 36/00 | (2009.01) |
| H04W 48/18 | (2009.01) |
| H04W 16/14 | (2009.01) |
| H04W 48/16 | (2009.01) |
| H04W 24/00 | (2009.01) |

(52) U.S. Cl.
CPC .......... *H04W 16/14* (2013.01); *H04W 48/16* (2013.01); *H04W 24/00* (2013.01); *H04W 48/18* (2013.01)

(58) Field of Classification Search
CPC ..... H04W 36/30; H04W 36/28; H04W 36/32; H04W 36/34; H04W 36/36; H04W 36/16; H04W 36/00; H04W 36/03; H04W 36/0094; H04J 11/0069
USPC ..... 455/443, 437–438, 67.11, 423, 436, 464, 455/448; 370/331–332, 333, 330, 328, 370/324
See application file for complete search history.

(56) References Cited

U.S. PATENT DOCUMENTS

| | | | |
|---|---|---|---|
| 7,453,912 B2 * | 11/2008 | Laroia ................... | H04B 1/005 370/330 |
| 8,121,602 B2 * | 2/2012 | Yi et al. ......................... | 455/436 |
| 8,688,120 B2 * | 4/2014 | Song et al. ................... | 455/436 |
| 2005/0255847 A1 * | 11/2005 | Han ....................... | H04W 36/30 455/436 |
| 2008/0151818 A1 * | 6/2008 | Brueck ................. | H04W 52/04 370/329 |

(Continued)

*Primary Examiner* — Julio R Perez
(74) *Attorney, Agent, or Firm* — Meyertons, Hood, Kivlin, Kowert & Goetzel, P.C.

(57) ABSTRACT

In order to facilitate communication in a dynamic cellular network, an accessibility issue in the dynamic cellular network may be detected. For example, if an electronic device is near the boundary between two adjacent cells in the dynamic cellular-telephone network, the signal power of signals from the adjacent cell may be higher than that of signals from the current servicing cell, which may offer an opportunity to improve communication performance. Thus, the accessibility issue may be detected if the difference is larger than a threshold value (such as 2-4 dB). In response to detecting the accessibility issue, a remedial action may be performed, such as repeating at least a portion of an acquisition process. In this way, the communication technique may improve the communication performance of the electronic device in the dynamic cellular network, thereby improving the user experience and customer satisfaction.

21 Claims, 6 Drawing Sheets

(56) References Cited

U.S. PATENT DOCUMENTS

| | | | | |
|---|---|---|---|---|
| 2008/0220784 A1* | 9/2008 | Somasundaram | ................. | H04W 36/0083 455/437 |
| 2008/0225801 A1* | 9/2008 | Turk | ................. | H04W 36/32 370/332 |
| 2010/0029276 A1* | 2/2010 | Hwang | ................. | H04W 36/30 455/436 |
| 2010/0124928 A1* | 5/2010 | Ergen | ................. | H04W 36/30 455/436 |
| 2010/0304738 A1* | 12/2010 | Lim | ................. | H04W 36/30 455/426.1 |
| 2011/0275402 A1* | 11/2011 | Charipadi | ................. | H04W 56/0035 455/522 |
| 2012/0269172 A1* | 10/2012 | Chin | ................. | H04W 36/32 370/332 |
| 2014/0045543 A1* | 2/2014 | Ishii | ................. | H04W 52/146 455/522 |

* cited by examiner

ACCESSIBILITY IN DYNAMIC CELLULAR NETWORKS

CROSS REFERENCE TO RELATED APPLICATION

This application claims priority under 35 U.S.C. § 119(e) to U.S. Provisional Application Ser. No. 61/711,524, entitled "Improved Accessibility in Dynamic Cellular Networks," by Zhu Ji and Johnson O. Sebeni, filed on Oct. 9, 2012, the contents of which is herein incorporated by reference.

BACKGROUND

Field

The described embodiments relate to techniques for improving communication in dynamic cellular networks.

Related Art

Many electronic devices, such as cellular telephones, include a networking subsystem that is used to wirelessly communicate with other electronic devices in a dynamic cellular network. For example, these electronic devices can include a networking subsystem with a cellular-telephone network interface (UMTS, LTE, etc.).

However, a variety of environmental conditions can adversely affect communication in the dynamic cellular network. For example, interference from signals in adjacent cells in a cellular-telephone network and multi-path signals can significantly degrade communication quality. This degradation can cause reduced data rates and loss of connections. In addition, it can take a long time for the communication quality to recover. All these problems degrade the user experience and are frustrating to users of electronic devices.

SUMMARY

The described embodiments relate to an electronic device. This electronic device includes: an antenna; an interface circuit, coupled to the antenna, that communicates in a dynamic cellular network; a processor coupled to the interface circuit; and memory that stores a program module that is executed by the processor. The program module facilitates communication in the dynamic cellular network. In particular, the program module detects an accessibility issue during the communication in the dynamic cellular network, where the accessibility issue includes a signal-strength metric for a current connection in the dynamic cellular network being less than a second signal-strength metric for an alternate connection in the dynamic cellular network by a threshold value (such as 2-4 dB). Then, the program module performs remedial action to address the accessibility issue.

Note that the current connection may be to a current serving cell in a cellular-telephone network, and the alternate connection may be to a neighboring serving cell in the cellular-telephone network.

In some embodiments, detecting the accessibility issue involves: determining that a signal-to-noise ratio for the communication with the current serving cell is less than a second threshold value (such as 5 dB); determining that another signal-strength metric for the current connection is less than a third threshold value (such as −100 or −110 dBm); determining an aggregate frequency error over time relative to a carrier frequency for the communication via the current connection; and/or determining an aggregate timing error over time for the communication via the current connection.

Moreover, the communication may involve a communication protocol, such as long-term evolution (LTE).

Furthermore, a given signal-strength metric, which can include one of the signal-strength metric and the second signal-strength metric, may include a reference signal received power.

Additionally, performing the remedial action may involve: an acquisition process that excludes a frequency scan; an acquisition process that includes a frequency scan; resynchronizing the carrier frequency for the communication via the current connection; and/or resynchronizing timing of the communication via the current connection.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to facilitate communication in a dynamic cellular network, an accessibility issue in the dynamic cellular network may be detected. For example, if an electronic device is near the boundary between two adjacent cells in a cellular-telephone network, the signal power of signals from the adjacent cell may be higher than that of signals from the current servicing cell, which may offer an opportunity to improve communication performance. Thus, the accessibility issue may be detected if the difference is larger than a threshold value (such as 2-4 dB). In response to detecting the accessibility issue, a remedial action may be performed, such as repeating at least a portion of an acquisition process. In this way, the communication technique may improve the communication performance of the electronic device in the dynamic cellular network, thereby improving the user experience and customer satisfaction.

Figure 1:
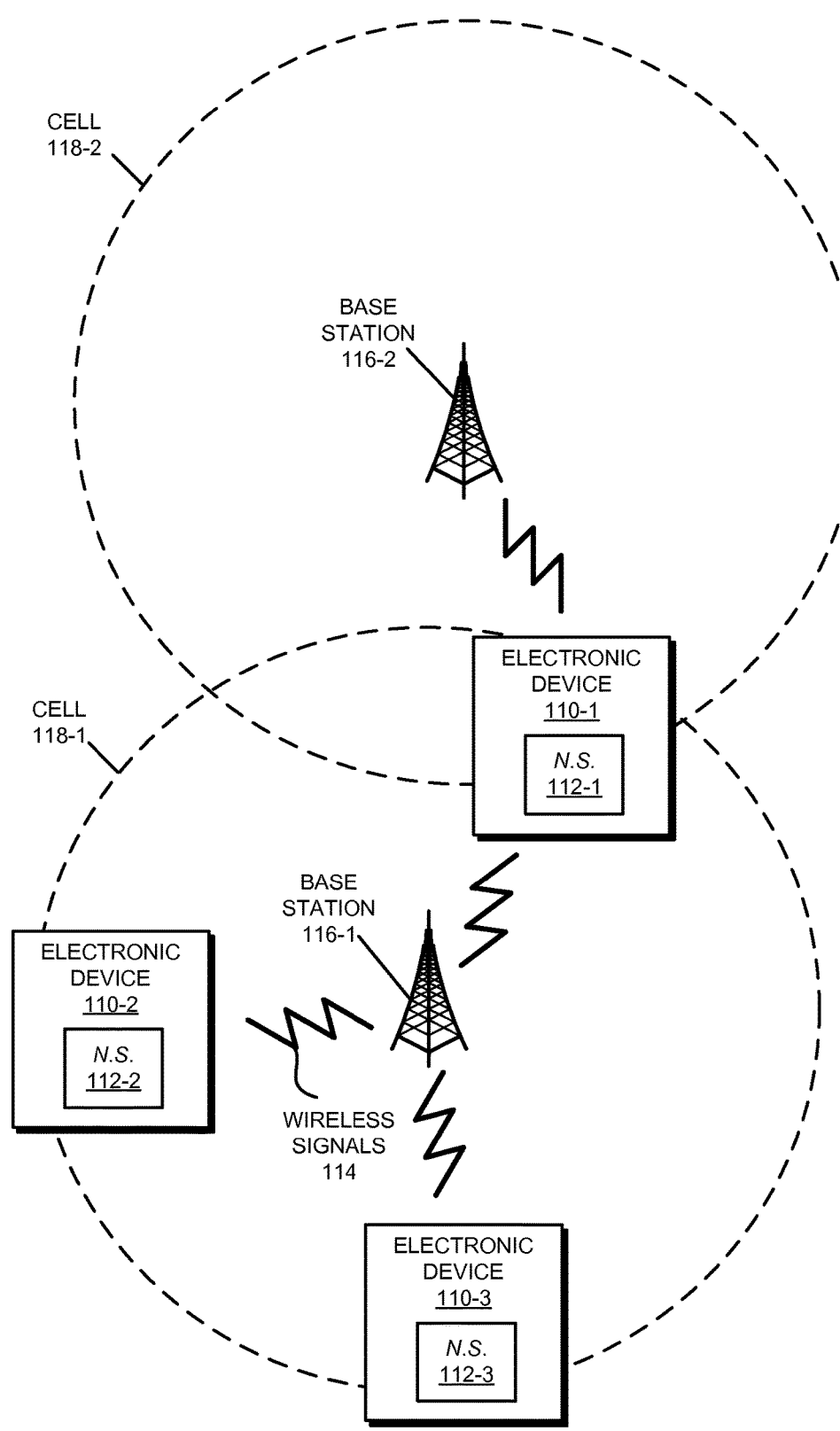
FIG. 1 is a block diagram illustrating electronic devices wirelessly communicating in a dynamic cellular network in accordance with an embodiment of the present disclosure.

The communication between electronic devices is shown in FIG. 1, which presents a block diagram illustrating electronic devices 110 which are wirelessly communicating in a dynamic cellular network. In particular, these electronic devices may wirelessly communicate while: acquiring one another by scanning wireless channels in the dynamic cellular network, transmitting and receiving frames on wireless channels, establishing connections (for example, by transmitting scheduling requests), and/or transmitting and receiving packets (which may include the commands and/or the information as payloads).

Figure 6:
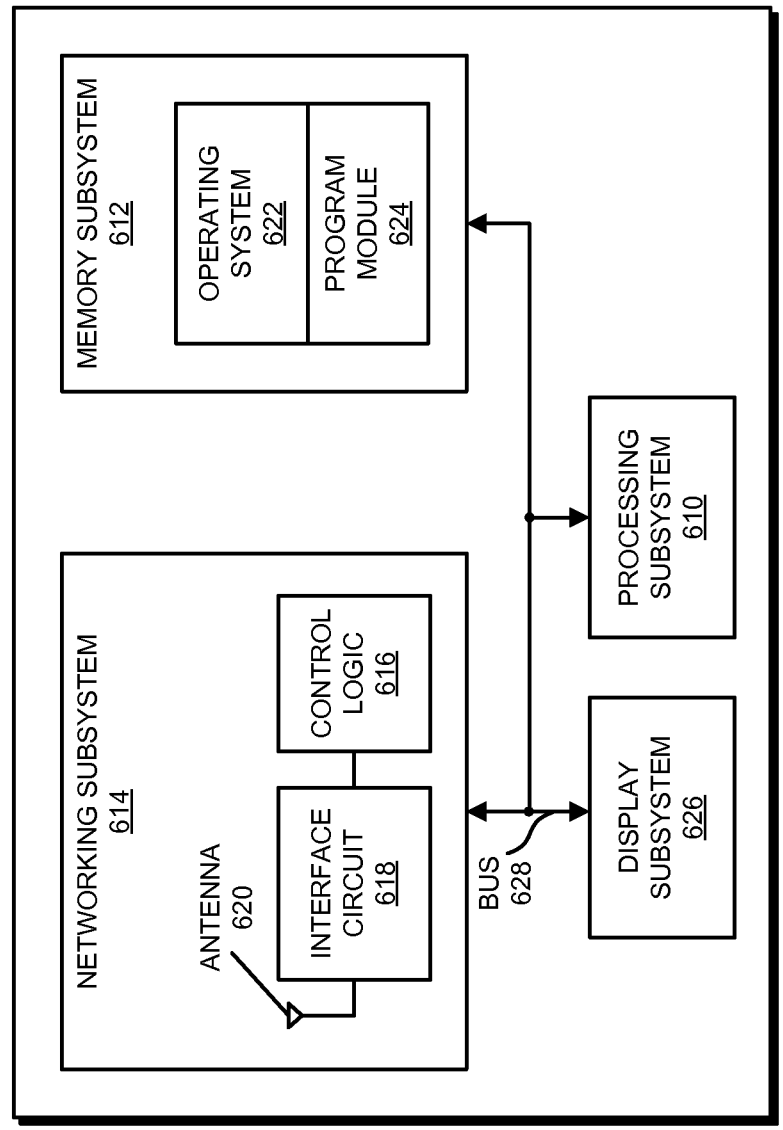
FIG. 6 is a block diagram illustrating an electronic device in accordance with an embodiment of the present disclosure.

As described further below with reference to FIG. 6, each of electronic devices 110 may include subsystems, such as a networking subsystem, a memory subsystem and a processor subsystem. In addition, electronic devices 110 may include radios in networking subsystems (N.S.) 112. More generally, electronic devices 110 can include (or can be included within) any electronic devices with the networking subsystems that enable electronic devices 110 to wirelessly communicate with another electronic device. This can comprise: transmitting messages on wireless channels to enable electronic devices to make initial contact, followed by exchanging subsequent messages to establish a connection; and transmitting and receiving packets or frames via the connection, etc.

As can be seen in FIG. 1, wireless signals 114 (represented by jagged lines) are communicated with base stations 116 in cells 118 using radios in electronic devices 110.

In the described embodiments, processing a packet or frame in electronic devices 110 includes: receiving wireless signals 114 with the packet or frame; decoding/extracting the packet or frame from received wireless signals 114 to acquire the packet or frame; and processing the packet or frame to determine information contained in the packet or frame (such as the command or the information in the payload).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

In the discussion that follows, a Long Term Evolution (LTE)-compatible communication protocol (such as LTE 4G or LTE Advanced from the $3^{rd}$ Generation Partnership Project in Asia, Europe and North America) with data rates between 100 Mb/s and 1 Gb/s is used as an illustrative example during communication in the dynamic cellular network. However, the communication technique may be used with a wide variety of other communication protocols, such as: Wi-Fi communication protocol (and, more generally, a wireless communication protocol described in the Institute of Electrical and Electronics Engineers (IEEE) standards 802.11), Bluetooth™ (from the Bluetooth Special Interests Group of Kirkland, Wash.), and/or other types of wireless interfaces.

As discussed previously, a variety of scenarios may degrade the communication performance in the dynamic cellular network. In one case, one of electronic devices 110 (such as electronic device 110-1) may be stuck in a weaker cell while not being able to be camped on the best cell available for an extensive time period. This can occur when an electronic device is at the intersection of multiple cells, and because of the dynamics of the wireless channels, the electronic device may reselect or hand over to a cell that soon becomes worse compared to other cells. For example, in order to avoid ping-pong effects, in general there are hysteresis values defined in the cellular specifications that typically only allow reselection or hand over when the strength of the neighboring cells become greater than the serving cell by more than a threshold. Because of the hysteresis, the electronic device can be stuck in a weaker current cell (such as cell 118-1) for an extensive period, especially when it is stationary, so long as the signal strength from the neighboring cells is less than this threshold.

Therefore, the accessibility of the electronic device can be significantly impacted in this scenario because of strong interference from the neighbor cell(s). For example, in LTE, this interference can lead to random access failures, such as message 2 (MSG2), which is the response in the physical layer acknowledging receipt of the physical probing sequence in message 1 (MSG1) when attempting to establish a connection with the base station (eNB) in the downlink, not being received properly at the electronic device. Alternatively, the interference from the neighboring cell(s) may result in low signal-to-noise ratios (SNRs) and, thus, a high downlink block error rate (BLEB). As a consequence, the electronic device can be stuck in a continuous failing random-access-channel (RACH) attempt for an extended period of time, which will result in LTE showing as the selected system but with no connectivity.

In another communication-performance-degradation scenario, wireless channel dynamics can lead to varying cell strength from multiple cells that poses challenges to cell selection and hand over. Moreover, it may lead to frequent cell reselections and hand overs that deteriorate the accessibility because of their overhead. Furthermore, electronic-device mobility can also lead to varying cell strength from multiple cells that have similar impact as the dynamic wireless channels. In addition, the mobility can result in the electronic device getting to the boundary of the coverage of the main technology (such as LTE for a multi-mode electronic device) so that other radio access technology may become a viable option.

For example, with synchronized cells, the reference signals or RS (e.g., pilot signal in the context of LTE) and the synchronization signals (such as the primary synchronization signals or PSS and the secondary synchronization signals or SSS) can have direct interferences from neighbor cells. Because RS, PSS and SSS are used in cell physical-layer techniques such as frequency control, timing control and channel estimation, the interfered pilot signals (i.e., RS, PSS and SSS) can lead to inaccurate frequency error estimation, timing error estimation and channel estimation. These errors can cause accessibility issues, such as: an inability to succeed in the random-access procedure (which is the initial operation of building up the connection in the dynamic cellular network); or a high downlink BLER that can cause extensive retransmission or data stall from the user-experience point of view. In addition, the pilot signals (such as RS in LTE) are often used by the electronic device to decide which cell is the most suitable cell for camping. Because the interference can corrupt the RS signals, and thus the serving and neighbor measurements, the interference can result in sub-optimal cell-selection decisions, which can cause a variety of accessibility issues.

Communication performance can also be degraded in a dynamic cellular network by moving paths. For a wireless multi-path channel, each path is associated with a delay value. It can be difficult for an electronic device to track the delay of a moving path to maximize the SNR of the received signals. This challenge may be important when a moving path is the strongest path.

In addition, there are scenarios in which: a new path shows up and may be a strong path; an existing path can disappear because of wireless-channel dynamics; and/or birth and death of paths can happen simultaneously. The birth and/or death of the paths can lead to challenges for the electronic device to synchronize the downlink timing with the eNB (i.e, a base station in the context of LTE). For example, a sudden birth and death of two paths, respectively, with a large delay difference can result in the downlink timing being out of sync, which can cause various accessibility issues, such as RACH failures and downlink/uplink performance degradation.

Communication-performance degradation can also occur during the transition from outside to inside, which can result in dramatic change of a multi-path profile and/or significant signal-strength variation associated with the change in environment.

Similar effects can occur in shielded spaces. For example, when a user enters or exits an elevator, the electronic device is put into a metal container, etc. As a consequence, the frequency and/or timing control loop may not converge because the signal strength from the eNB may be suddenly dropped to be close to the noise floor. When this occurs, the frequency error estimation or timing error estimation can become a random walk because these error estimates are then based on signals that are dominated by noise.

The accessibility of the electronic device to the dynamic cellular network can be significantly impacted in the aforementioned dynamic multi-cell scenarios without a communication technique that detects and recovers from the adverse conditions. Similarly, without the communication technique, the dynamic nature of wireless channels can cause the electronic device to be out-of-sync with basestations while not being able to be captured or timely providing indicators in the physical-layer and upper-layer procedures. Additionally, without the communication technique, indoor scenarios can pose challenges to physical-layer techniques that can result in various accessibility issues. Thus, because cellular specifications (such as LTE) often have not considered these dynamic-network scenarios, in the absence of the communication technique the protocol layers may be less adaptive or robust to these physical-layer challenges. This can result in the protocol layers repeating the same procedure with continuous failures while not being able to recover from it (e.g., continuous RACH procedure failures for the electronic device in a multi-cell scenario in which it is camped on a weaker cell indefinitely unless the electronic device of the wireless connection is restarted). Collectively, these communication-performance degradation mechanisms can adversely impact the user experience and, thus, can frustrate users of electronic devices 110.

Figure 2:
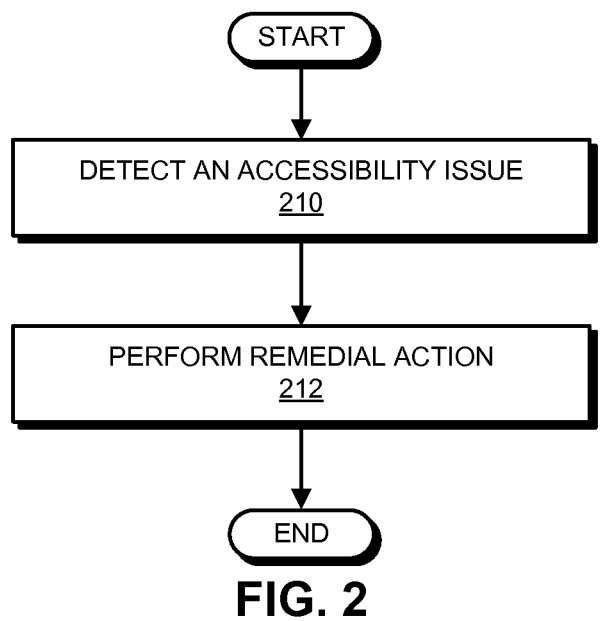
FIG. 2 is a flow diagram illustrating a method for communicating in the dynamic cellular network of FIG. 1 in accordance with an embodiment of the present disclosure.

This problem may be addressed using the communication technique in which a software application executing in an environment on a given one of electronic devices 110 detects an accessibility issue during communication in the dynamic cellular network, and then performs a remedial action. The communication technique is shown in FIG. 2, which presents a flow diagram illustrating a method 200 for communicating in the dynamic cellular network of FIG. 1, which may be performed by an electronic device (such as electronic device 600 in FIG. 6). During operation, the electronic device detects an accessibility issue (operation 210) during the communication in the dynamic cellular network, where the accessibility issue includes a signal-strength metric for a current connection in the dynamic cellular network being less than a second signal-strength metric for an alternate connection in the dynamic cellular network by a threshold value. For example, a given signal-strength metric (which can include one of the signal-strength metric and the second signal-strength metric) may include a reference signal received power, and the threshold value may be 2-4 dB. Then, the program module performs remedial action (operation 212) to address the accessibility issue.

Note that the current connection may be to a current serving cell in a cellular-telephone network, and the alternate connection may be to a neighboring serving cell in the cellular-telephone network In some embodiments, detecting the accessibility issue involves: determining that a signal-to-noise ratio for the communication with the current serving cell is less than a second threshold value (such as 5 dB); determining that another signal-strength metric for the current connection is less than a third threshold value (such as −100 or −110 dBm); determining an aggregate frequency error over time relative to a carrier frequency for the communication via the current connection; and/or determining an aggregate timing error over time for the communication via the current connection.

Moreover, the communication may involve a communication protocol, such as long-term evolution (LTE).

Additionally, performing the remedial action may involve: an acquisition process that excludes a frequency scan; an acquisition process that includes a frequency scan; resynchronizing the carrier frequency for the communication via the current connection; and/or resynchronizing timing of the communication via the current connection.

Therefore, the communication technique may allow the user to access the dynamic cellular network quickly and with minimal effort, which may reduce user frustration and improve the user experience.

In some embodiments of method 200, there may be additional or fewer operations. Moreover, the order of the operations may be changed, and/or two or more operations may be combined into a single operation.

We now describe exemplary embodiments of the communication technique. In these embodiments, the accessibility detection criteria can include those needed to detect: a multi-cell scenario; a physical-layer out-of-sync scenario; and/or a specific protocol-layer failure. Moreover, the remedial action to improve accessibility may include: partial acquisition (Re-ACQ) or full acquisition (ACQ); frequency and/or timing re-synchronization; and/or re-initiation of upper-layer procedures.

Figure 3:
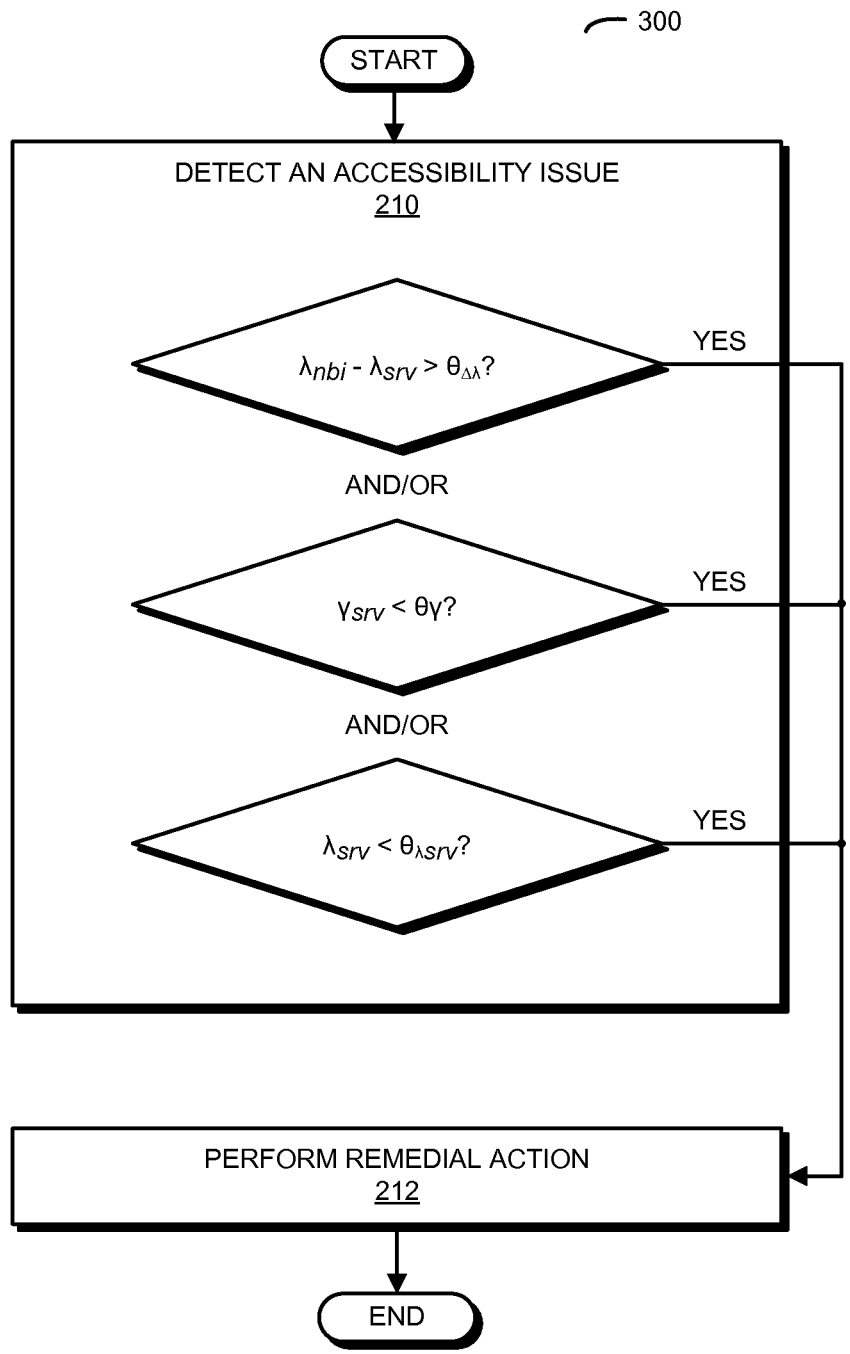
FIG. 3 is a flow diagram illustrating a method for detecting accessibility issues in the dynamic cellular network of FIG. 1 in accordance with an embodiment of the present disclosure.

FIG. 3 presents a flow diagram illustrating a method 300 for detecting accessibility issues in the dynamic cellular network of FIG. 1, such as those associated with multi-cell scenarios. Note that method 300 may utilize: a signal-strength metric (such as an averaged received signal received power or RSRP, which is a metric in LTE for evaluating the cell strength, or the received signal strength indicator or RSSI) for the serving and neighbor cells or $\lambda_{srv}$, $\lambda_{nb1}$, $\lambda_{nb2}$, etc.; and/or the serving-cell estimated SNR over time or $\lambda_{srv}$. These parameters may be determined or measured by networking subsystems 112.

As shown in FIG. 3, the principal criterion for detecting the accessibility issue is that $\lambda_{srv}$ is lower than the strongest neighbor measurement by more than a threshold $\theta_{\Delta\lambda}$, such as 2-4 dB. Additionally, the criteria in method 300 may optionally include at least one of: $\gamma_{srv}$ below a threshold $\theta_\gamma$, such as 5 dB (which may correspond to low SNR); and $\lambda_{srv}$ below a threshold $\theta_{\lambda_{srv}}$, such as −100 or −110 dBm (which may indicate that the electronic device is far from the eNB in the current cell and that there are multiple neighboring cells). This criterion (or criteria) may ensure the detection of scenarios in which the electronic device can get a better connection from one of the neighbor cells while being stuck in a sub-optimal serving cell in which the SNR is non-ideal and the RSRP still indicates reasonable cell strength.

Figure 4:
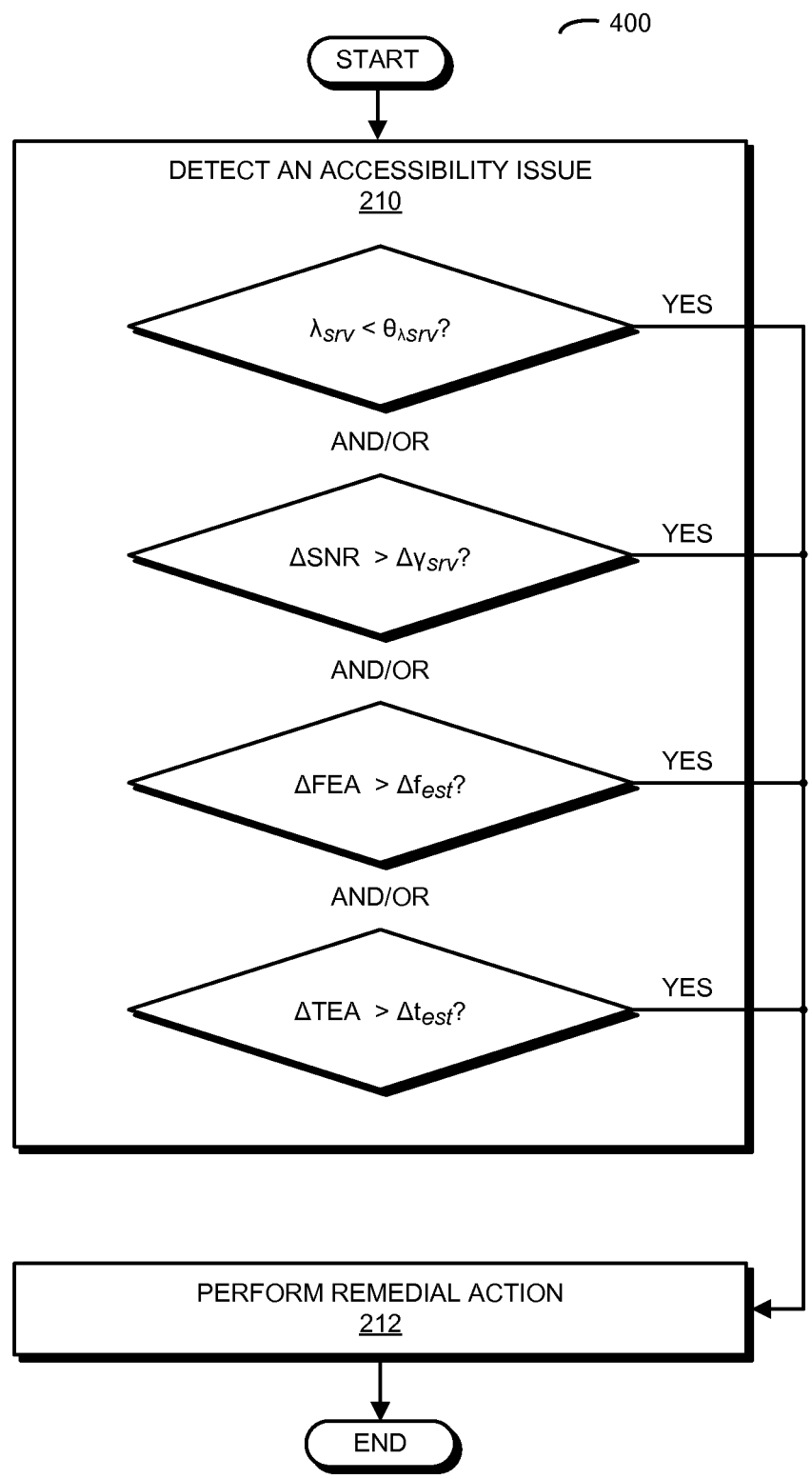
FIG. 4 is a flow diagram illustrating a method for detecting accessibility issues in the dynamic cellular network of FIG. 1 in accordance with an embodiment of the present disclosure.

FIG. 4 presents a flow diagram illustrating a method 400 for detecting accessibility issues in the dynamic cellular network of FIG. 1, such as those associated with physical-layer out-of-sync scenarios. Note that method 400 may utilize: $\lambda_{srv}$ (such as RSRP); $\lambda_{srv}$; the accumulated frequency-error adjustment in the electronic device over time $f_{est}$; and/or the accumulated timing-error adjustment in the electronic device over time $t_{est}$. These parameters may be determined or measured by networking subsystems 112.

As shown in FIG. 4, the principal criterion for detecting the accessibility issue is that $\lambda_{srv}$ is below $\theta_{\lambda srv}$, such as −100 to −110 dBm. Additionally, the criteria in method 300 may optionally include at least one of: if there is a sudden decrease in the SNR (ΔSNR) over a short period of time by more than a threshold $\Delta\gamma_{srv}$, such as 10-20 dB; if there is a sudden change of frequency-error adjustment (ΔFEA) over a short period of time by more than a threshold $\Delta f_{est}$, such as more than 500 Hz over 100 ms (note, however, that this value depends on the carrier frequency); and/or if there is a sudden change of timing-error adjustment (ΔTEA) over a short period of time by more than a threshold $\Delta t_{est}$, such as a change of 10-20 μs in 200 ms. This criterion (or criteria) may ensure the detection of scenarios in which the electronic device has a reasonable RSRP, but the SNR, frequency-error estimation and/or timing-error estimation has a sudden change that is beyond the range of values for normal channel variations (such as dramatic physical-layer variations that result in an out-of-sync scenario).

Figure 5:
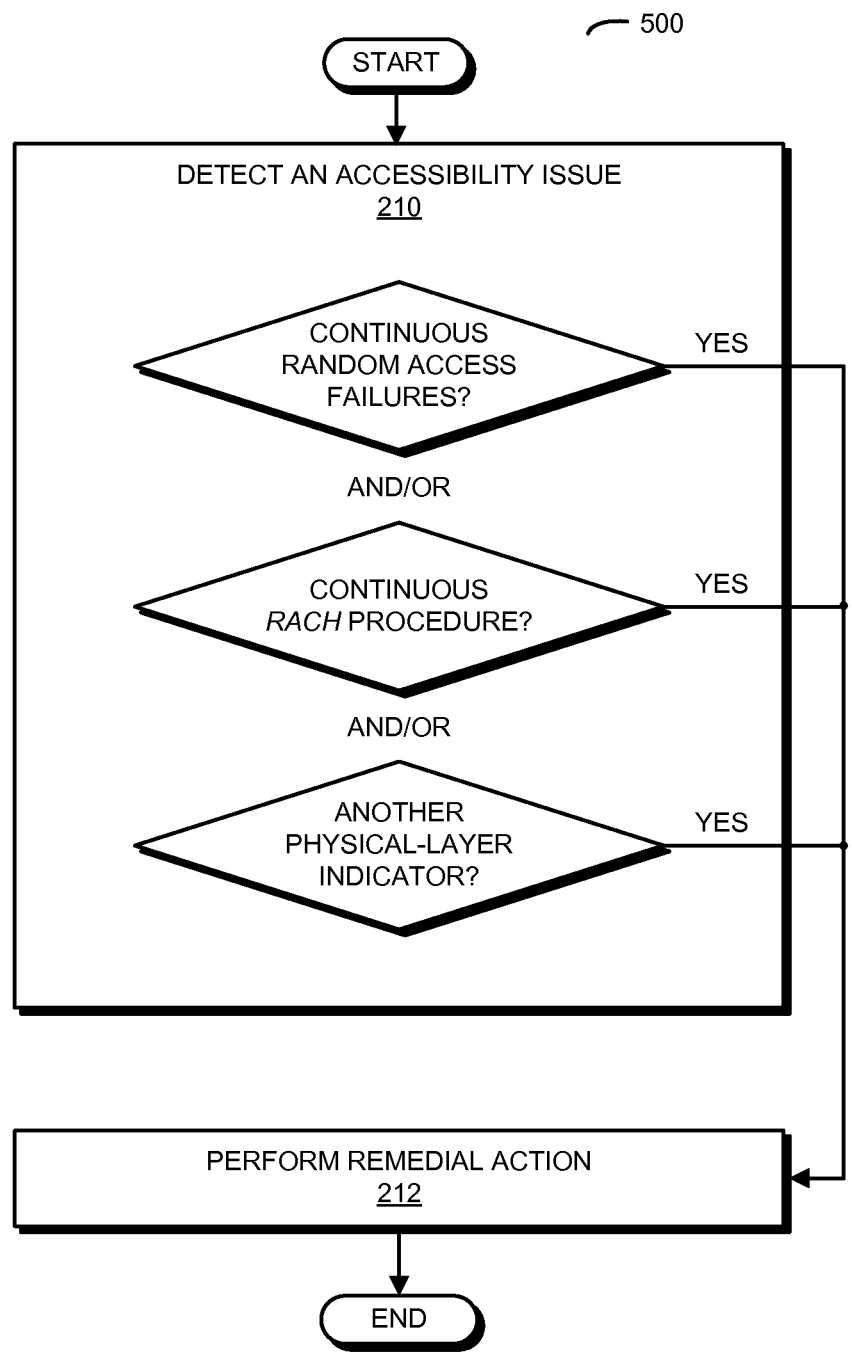
FIG. 5 is a flow diagram illustrating a method for detecting accessibility issues in the dynamic cellular network of FIG. 1 in accordance with an embodiment of the present disclosure.

FIG. 5 presents a flow diagram illustrating a method 500 for detecting accessibility issues in the dynamic cellular network of FIG. 1, such as those associated with specific protocol-layer failures. These protocol-layer failures may include: continuous random access failures, such as an inability to decode a MSG2 response to MSG1 (for example, there may be lots of MSG1s but no MSG2 in response); a continuous RACH procedure that requests for uplink data (for example, it may fail 3× in a row), which may indicate the sudden deterioration of the channel status or cell strength; and/or these protocol-layer failures in conjunction with at least another of the physical-layer indicators described in FIGS. 3 and 4.

A variety of ACQ procedures may be used for remedial action when an accessibility issue is detected. For example, a full ACQ procedure (in which network information is acquired) may be performed, including the operations of: a list frequency scan or full frequency scan to try various available center frequencies and eligible bandwidths; a cell search based on the PSS and/or the SSS to obtain the cell timing; an initial frequency-error estimation based on the PSS and/or the SSS; physical-broadcasting-channel decoding to obtain the master information block (MIB); and system-information-block (SIB) decoding to obtain system-configuration information. Note that the MIB includes a limited number of the most frequently transmitted parameters that are used to acquire other information from the cell, such as: the downlink bandwidth of the cell, the physical hybrid ARQ indicator channel, and the system frame number. The MIB is typically transmitted on the broadcast-control channel, while other system-information messages are usually transmitted on the downlink-shared channel.

Alternatively, a Re-ACQ procedure may be performed to recover or regain the accessibility to the dynamic cellular network. Based on the symptoms of the accessibility issue, the Re-ACQ procedure may not include all of the operations in the full ACQ procedure. For example, by doing cell search and initial frequency estimation based on the PSS and/or the SSS, the Re-ACQ procedure may camp on the most-suitable cell for better accessibility with the associated communication performance improvement. Therefore, in some embodiments the Re-ACQ procedure may exclude the list frequency scan or full frequency scan.

In some embodiments, the remedial action includes frequency and/or timing re-synchronization. For example, if the accessibility issue is associated with suddenly deteriorated frequency and timing tracking or estimation, the frequency and/or timing re-synchronization can align the frequency and timing of the electronic device with limited overhead at the physical layer. In particular, the re-synchronization may be based on the RS (and may exclude the PSS and the SSS). However, re-synchronization may require frequency-and-timing estimation with larger pull-in ranges so that a large frequency-and-timing error that is beyond the regular frequency and timing control loops (FTL and TTL) can be detected (for example, the pull-in range may be 2× larger). This larger pull-in range may be more computation intensive or may require the use of more pilot-signal information compared to regular FTL and TTL. Nonetheless, the benefits from the re-synchronization may significantly outweigh the cost in scenarios in which the accessibility issue is because the FTL or TTL is stuck for an extensive period and cannot be recovered.

In some embodiments, the remedial action includes re-initiating upper-layer procedures in software or firmware. Re-initiating the upper-layer procedures with other physical layer mechanisms can help the recovery and can regain the accessibility of the electronic device, for example, for the accessibility issue detected in FIG. 5. In particular, the re-initiating can include: declaring a radio-link failure and performing a full ACQ to reestablish the link between the electronic device and the eNB; forcing a scheduling request sent from the electronic device to the eNB to request the uplink grants (i.e., when the downlink is okay but the uplink grant from the eNB cannot close the loop, such as when the electronic device and the eNB are out of synch); and/or re-initiating the RACH procedure to have an updated timing advance adjustment from the eNB.

In these ways, the communication technique may be used to restore accessibility and/or improve communication performance in a dynamic cellular network.

We now describe embodiments of the electronic device. FIG. 6 presents a block diagram illustrating an electronic device 600. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 624), which may be executed by processing subsystem 610. Note that the one or more computer programs may constitute a computer-program mechanism. Moreover, instructions in the various modules in memory subsystem 612 may be implemented in: a highlevel procedural language, an object-oriented programming language, and/or in an assembly or machine language. Furthermore, the programming language may be compiled or interpreted, e.g., configurable or configured, to be executed by processing subsystem 610. Note that program module 624 may include software and/or firmware.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and an antenna 620. For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising frames and/or scanning for advertising frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections between the subsystems.

In some embodiments, electronic device 600 includes a display subsystem 626 for displaying information on a display, which may include a display driver and the display, such as a liquid-crystal display, a touchscreen, etc.

Furthermore, as described previously, program module 624 may perform the operations in any of methods 200 (FIG. 2), 300 (FIG. 3), 400 (FIG. 4) and/or 500 (FIG. 5), including detecting the accessibility issue and performing the remedial action.

Electronic device 600 can be (or can be included in) any electronic device with at least one network interface. For example, electronic device 600 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 600, in alternative embodiments, different components and/or subsystems may be present in electronic device 600. For example, electronic device 600 may include one or more additional instances of processing subsystem 610, memory subsystem 612, networking subsystem 614, and/or display subsystem 626. Additionally, one or more of the subsystems may not be present in electronic device 600. Moreover, in some embodiments, electronic device 600 may include one or more additional subsystems that are not shown in FIG. 6. For example, electronic device 600 can include, but is not limited to: a power subsystem (such as a battery), a data collection subsystem, an audio and/or video subsystem, an alarm subsystem, a media processing subsystem, and/or an input/output (I/O) subsystem. Also, although separate subsystems are shown in FIG. 6, in some embodiments, some or all of a given subsystem or component can be integrated into one or more of the other subsystems or component(s) in electronic device 600. For example, program module 624 may be included in operating system 622.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While LTE was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna;
   an interface circuit, coupled to the antenna, configured to communicate in a dynamic cellular network; and
   a processor;
   wherein the processor is configured to:
      monitor a difference between a signal-strength metric for a current connection and a signal-strength metric for an alternate connection and compare the difference to a first threshold value;
      monitor, for the current connection, a change of signal-to-noise (SNR) over a period of time and compare the change of SNR over the period of time to a second threshold value; and
      perform remedial action based on detection of an accessibility issue, wherein the accessibility issue comprises at least one of:
         the difference exceeding the first threshold; or
         the change of SNR over the period of time increasing above the second threshold.

2. The electronic device of claim 1, wherein the communication involves a communication protocol; and
   wherein the communication protocol includes long-term evolution (LTE).

3. The electronic device of claim 1, wherein a given signal-strength metric, which can include one of the signal-strength metric and the second signal-strength metric, includes a reference signal received power.

4. The electronic device of claim 1, wherein the current connection is to a current serving cell in a cellular-telephone network; and
   wherein the alternate connection is to a neighboring serving cell in the cellular-telephone network.

5. The electronic device of claim 1,
   wherein the processor is further configured to:
      monitor another signal-strength metric and compare the another signal-strength metric to a third threshold;
   wherein the accessibility issue further comprises the another signal-strength metric decreasing below a third threshold.

6. The electronic device of claim 1,
   wherein the processor is further configured to monitor an aggregate frequency error over the period of time relative to a carrier frequency for the communication via the current connection.

7. The electronic device of claim 1,
   wherein the processor is further configured to monitor an aggregate timing error over the period of time for the communication via the current connection.

8. The electronic device of claim 1, wherein the first threshold value is between 2 and 4 dB.

9. The electronic device of claim 1, wherein to perform the remedial action, the processor is further configured to perform an acquisition process that excludes a frequency scan.

10. The electronic device of claim 1, wherein to perform the remedial action, the processor is further configured to perform an acquisition process that includes a frequency scan.

11. The electronic device of claim 1, wherein to perform the remedial action, the processor is further configured to perform resynchronizing a carrier frequency for the communication via the current connection.

12. The electronic device of claim 1, wherein to perform the remedial action, the processor is further configured to perform resynchronizing timing of the communication via the current connection.

13. The electronic device of claim 1,
   wherein the processor is further configured to:
      monitor a change of frequency error adjustment (FEA) over the period of time and compare the change of FEA over the period of time to a third threshold;
   wherein the accessibility issue further comprises:
      the change of FEA over the period of time increasing above a third threshold.

14. The electronic device of claim 1,
   wherein the processor is further configured to:
      monitor a change of timing-error adjustment (TEA) over the period of time and compare the change of TEA over the period of time to a third threshold;
   wherein the accessibility issue further comprises:
      the change of FEA over the period of time increasing above a third threshold.

15. A computer-program product for use in conjunction with an electronic device, the computer-program product comprising a non-transitory computer-readable storage medium and a computer-program mechanism embedded therein, to facilitate communication in a dynamic cellular network, the computer-program mechanism executable by a processor to:
   monitor a difference between a signal-strength metric for a current connection and a signal-strength metric for an alternate connection and compare the difference to a first threshold;
   monitor a change of signal-to-noise (SNR) over a period of time for the current connection and compare the change of SNR over the period of time to a second threshold value; and
   perform remedial action based on detection of an accessibility issue, wherein the accessibility issue comprises at least one of:
      the difference exceeding the first threshold; or the change of SNR over the period of time increasing above the second threshold.

16. The computer-program product of claim 15,
wherein the current connection is to a current serving cell in a cellular-telephone network; and
wherein the alternate connection is to a neighboring serving cell in the cellular-telephone network.

17. The computer-program product of claim 15,
wherein the computer-program mechanism is further executable by the processor to:
monitor another signal-strength metric and compare the another signal-strength metric to a third threshold;
wherein the accessibility issue further comprises the another signal-strength metric decreasing below a third threshold.

18. The computer-program product of claim 15, wherein to perform the remedial action, the computer-program mechanism is further executable by the processor to perform an acquisition process that excludes a frequency scan.

19. An electronic-device-implemented method for communicating in a dynamic cellular network, wherein the method comprises:
monitoring an aggregate timing error over time for the communication via the current connection and comparing the aggregate timing error to a first threshold;
monitoring a change of signal-to-noise (SNR) over a period of time for the current connection and comparing the change of SNR over the period of time to a second threshold value; and
performing remedial action based on detection of an accessibility issue, wherein the accessibility issue comprises at least one of:
the aggregate timing error exceeding the first threshold; or
the change of SNR over the period of time increasing above the second threshold.

20. The electronic-device-implemented method of claim 19,
wherein performing the remedial action comprises resynchronizing a carrier frequency for the communication via the current connection.

21. The electronic-device-implemented method of claim 19, wherein performing the remedial action comprises resynchronizing timing of the communication via the current connection.

* * * * *